3,265,658
PROCESS FOR PRODUCING POLYETHYLENE IN THE PRESENCE OF CARBON BLACK

Otto Liethen, Karl-Albert Strasse 20, Duisburg-Beek, Germany, and Walter Rottig, Höhenweg 143, Oberhausen-Sterkrade-Nord, Germany
No Drawing. Filed Feb. 28, 1963, Ser. No. 261,832
Claims priority, application Germany, Jan. 16, 1958, R 22,504
4 Claims. (Cl. 260—41)

This application is a continuation-on-part of application Serial No. 785,556, filed January 8, 1959, now abandoned.

This invention relates to the polymerization of olefins, particularly ethylene, in the presence of carbon black.

It already has been suggested, e.g. in assignee's co-pending Application S.N. 690,533, now abandoned, to improve the properties of polymers of low molecular weight olefins, e.g. of polyethylene, by the admixture of carbon black. This results in an efficient increase in resistance to light and oxydation as well as in a favorable influence on the mechanical properties of the polymer. However, a condition for this effect is as uniform and intimate as possible a distribution of the carbon black throughout the polymer. This is generally accomplished by intense agitation of the polymer mixture, e.g. polyethylene, and carbon black for an extended period of time in suitable mixers.

The addition of relatively small amounts of carbon black to polyethylene resins will sometimes suffice when the addition of the carbon black is for ultra violet light stabilization or coloration purposes. Thus, when employed for ultra violet stabilization, the use of as little as 2–½% by weight of carbon black in the polymer can serve to provide improved results. Where the carbon black is used as a colorant amounts as low as ½ to 1% are sometimes employed. Unfortunately, with the equipment available for mixing solids in the resin industry, for example, Banbury and double roll mixers, it is virtually impossible to obtain uniform mechanical mixing of such small amounts of carbon black into polyethylene resins.

The formation of highly-concentrated mixtures or "masterbatches" of carbon black in polyethylene and subsequent incorporation of the same in polyethylene to be black loaded provides a convenient method by which small amounts of carbon black may be homogeneously intermingled with relatively large amounts of polyethylene. The preparation of highly-concentrated mixtures of carbon black in polyethylene has also been found to result in re-inforcing of the polyethylene, and superior physical properties in polyethylene so modified are produced. For the foregoing and other reasons, therefore, preparation of polyethylene compositions containing relatively high amounts of carbon black uniformly dispersed therein is of considerable advantage, and it has been found that polyethylene compositions containing a relatively large proportion, i.e. above 10%, more preferably 25 to 50% and above, of black possess characteristics which make them valuable articles of commerce. As in the case of the less concentrated compositions, however, preparation of highly-loaded polyethylene compositions, particularly those containing more than 25 to 30% of black, is difficult with the equipment presently available. Even where polyolefin compositions containing a desired level of black can be mechanically prepared, incorporation by means of Banbury and double roll mixers necessitates additional processing which is expensive and otherwise undesirable.

A substantially better distribution and improved coherence between the two materials, i.e. the polymer and the added carbon black, can be obtained if the polymer, so to say, is made to form on the carbon black.

It is an object of this invention to provide a process for the production of compositions of polyolefins, particularly polyethylenes, and carbon black having the properties mentioned above, said process being characterized in that the polymerization of olefins containing 2 to 7 and preferably 2 to 4 carbon atoms effected at pressures up to about 100 kg./cm.$^2$ and temperatures up to about 100° C. and in the presence of catalysts consisting of mixtures of organometallic compounds of group 3 of Mendeleev's Periodic Table, particularly aluminum alkyl compounds, with compounds of metals of the 4th to 6th subgroups of that Periodic Table, particularly titanium halides, is carried out in the presence of carbon black. This mode of operation is particularly well applicable to the modern so-called "low pressure processes" for the production of polyolefins (e.g. Ziegler, Phillips or Stanolind Processes), all of which use a suspending liquid in the polymerization. The following description relates to the method of operation in accordance with the invention as applied to the so-called Ziegler process without the intent, however, of limitation to that particular process.

As is well known, the low pressure processes are versatile systems which permit a wide variety of stereoregular and other polymers to be prepared at advantageously low temperatures and pressures. The catalysts used in such processes are particularly sensitive to the presence of various substances, however, which if not carefully avoided, may be present and act as deleterious contaminants. Ziegler-type catalysts, i.e. those containing organometallic constituents in combination with various heavy metal transition compounds, are, for example, adversely affected by any such contaminants present (infra), and their presence can produce a wide range of detrimental effects including undesirable product changes and difficulties related to the manufacturing process itself. While it might perhaps have been supposed that relatively small amounts of carbon black, that is, no more than 5% by weight, based on the product produced, could be added to the polymerization without unduly upsetting the reaction system, it was greatly surprising to discover that extremely large (and desirable) amounts of carbon black, that is from 10 to 25%, even more advantageously 25 to 50% and above, could be added to the polyethylene during formation of the latter without substantial ill effect. That such a result was totally unexpected will be readily appreciated from the fact that water is a contaminant in catalyst systems of the foregoing type, and its variable presence in amounts as small as about 25 parts per million by weight, based on the total weight of reaction mixture employed, can cause the molecular weight of the polymer produced to change in an unpredictable manner. Since many of the important properties of the polyethylene resins are dependent upon molecular weight, fluctuations in this property are most undesirable. Equally objectionable, however, is the tendency toward formation of equipment fouling, gel-like deposits-promoted by the presence of water-which coat equipment and necessitate frequent shut-downs for cleaning purposes. Carbon black, widely known as a hygroscopic material, even as commercially supplied commonly contains water in amounts up to about 0.5% by weight, and carbon black bags opened for any length of time frequently are variably contaminated with 1 to 3% water.

Sulphur-containing compounds such as, for example mercaptans, are also materials which produce adverse effects in Ziegler polymerization systems. The presence of such contaminants in amounts as small as 6 parts per million, on a reaction mixture weight basis, can produce an inhibitory effect on the polymerization. The presence of such compounds in carbon black is to be expected, and a mercaptan content of up to 1% by weight of black is not considered unusual. Surprisingly, however, the presence of carbon black in the amounts disclosed does not prevent formation of valuable polyethylene compositions containing the loadings contemplated herein.

Oxygen, another material having a profound effect on Ziegler type polymerizations can be expected to be present in commercial carbon blacks in amounts up to 3% by weight, depending on the type of carbon black employed. As is widely known, the presence of oxygen in such polymerization results in wide variations in the molecular weight of the polymers produced with the consequences heretofore referred to. Numerous other materials such as, for instance, acetylene and the like, commonly associated with carbon black, have similar disadvantageous consequences when incorporated in low-pressure reaction systems, and the presence of such substances in carbon black provides additional reasons why feasibility of carbon black loadings of the magnitude taught herein was unexpected.

Notwithstanding the consequences naturally to be presumed by those having knowledge of the above facts, it has been found that relatively large amounts of carbon black may be incorporated in polyethylene through use of the process described more particularly hereinbelow.

The addition of carbon black to the suspending agent (e.g. a hydrogenated and dried diesel oil) may be effected before or after the introduction of the catalyst. The mixing of the catalyst may be effected in the reactor itself or in a separate apparatus using, if desired, a small amount of suspending agent. It is also possible to effect the interaction of the catalyst constituents in a separate apparatus in the presence of part or of the total quantity of carbon black and in appropriate quantity of suspending agent and to introduce this mixture, after the desired period of interaction, into the suspending liquid contained in the reactor. A still further method of adding the carbon black consists in soaking or suspending the carbon black with a given amount of suspending agent prior to adding it to the reactor and then introducing the mixture into the polymerization vessel before or after addition of the catalyst.

In cases where the catalyst and carbon black are combined prior to taking part in the polymerization, it will readily be appreciated that, inherently, the black provides a support for the catalyst system with the benefits deriving from such function.

Suitable catalysts include mixtures of alkyl derivatives and/or halogen alkyl derivatives and/or oxalkyl derivatives of a metal of group 3 of Mendeleev's Periodic Table, particularly of aluminum, and a compound of a transition metal of groups 4 to 6 of the Periodic Table, preferably a halogen compound of titanium or vanadium, it being possible for the compounds of the transition metals to be present in a valency stage lower than the maximum. Moreover, different starting metal compounds may be used. Examples of several catalytic systems include:

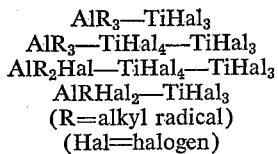

(R=alkyl radical)
(Hal=halogen)

The method of operation in accordance with the invention is not limited to a specific type of carbon black. Particularly well suited are those gas carbon blacks which have a uniform and very small particle size up to about 250 mμ, preferably up to 50 mμ.

The quantities of carbon black used may be as high as 50% and more. Peculiarly, however, at the lower loading levels especially where the carbon black constitutes no more than about 5% of the finished polymer, the polyethylene product is produced in the form of elongated, fibrous particles rather than in the more desirable fine, granular conformation. The fibrous particles present handling difficulties and are not as visually attractive as the granular product. For the foregoing and other reasons, therefore, it has been found preferable to incorporate carbon black in amounts greater than 5%, and incorporation of at least about 10% by weight of carbon black in the polyethylene produces a uniformly loaded product having particularly desirable properties. Although loadings of at least about 25% by weight are preferred, if desired, loadings as high as 50% and more can be employed.

When using carbon black of uniform particle size, the distribution of carbon black in the polyethylene is particularly even. The polymer-carbon black-composition is a light gray to dark gray powder, the intensity of color being dependent upon the content of carbon black.

If as high as possible a yield of polymer, based on 1 gram of catalyst, is desired, it is advantageous to remove any moisture from the carbon black by drying it at elevated temperatures and in a vacuum, if desired, prior to introducing the carbon black into the reactor or into the catalyst suspension. Also, it is preferable with certain catalytic systems, e.g. AlR$_3$—TiCl$_3$, to displace the air contained in the pores of the carbon black by an inert gas, e.g. nitrogen, while, with other systems, the air retained in the pores of the carbon black or even an addition of air will act catalytically.

This is true, for example, for the system $$AlR_2\text{---}TiHal_4\text{---}TiHal_3$$

The addition of specific amounts of air or of oxygen may be effected continuously or intermittently during the polymerization.

Irrespective of the quantity of carbon black applied, the molecular weight of the polymer produced is determined by the composition of the catalytic system or may, with many catalytic systems, e.g., with those mentioned above, be controlled by adding air or oxygen. Polymers having molecular weights of as high as several millions to as low as about 20,000 are obtained depending upon the composition of the catalyst.

Suitable suspending liquids include waterfree and inert organic liquids, e.g. aliphatic, naphthenic and aromatic hydrocarbons, which are free from alcohols, acids, peroxides, amines, sulfides and other impurities. Under certain conditions, the presence of small amounts of alcohols in the suspending liquid may be advantageous.

The polymerization may be carried out at atmospheric pressure or at an elevated pressure up to approximately 100 kg./cm.$^2$. The process may be carried out in both continuous and batch operations.

To reduce the ash content after completion of the polymerization, the composition of polymer and carbon black may be treated in a known manner, e.g. with alcohols with the addition, if desired, or inorganic or organic acids (hydrochloric acid, sulfuric acid, acetic acid, oxalic acid etc.). However, other methods known in the art may be used.

The distribution of carbon black in the polymers obtained in accordance with the invention is extremely uniform. While a subsequent mechanical treatment in a homogenizer, e.g. a suitable mixer, is possible, it is not necessary at all.

Processing of the polymer compositions to obtain various articles, such as tubes, sheets, injection-molded articles, etc., is likewise effected in a known manner.

The method of operation in accordance with the invention, as mentioned above, has the advantage that a subsequent homogenizing is not required. Furthermore, it is surprising that the yields of polymer obtained with the addition of carbon black are considerably higher than those obtained in comparative experiments carried out without the addition of carbon black.

The invention now will be further illustrated by means of the following examples. However, it should be understood that these are given merely by way of explanation, not of limitation, and that numerous changes may be made in the details without departing from the spirit and the scope of the present invention as hereinafter claimed.

EXAMPLE I 1800 ml. of a heavy benzine fraction derived from the Fischer-Tropsch synthesis and boiling between approximately 110 and 180° C. were thoroughly freed from oxygen-containing compounds and placed into a vessel of 5 liter capacity closed with a cover provided with a stirrer, a thermometer well, a gas inlet pipe and a gas outlet pipe. 0.34 g. triisobutyl aluminum and 0.27 g. of an amorphous $TiCl_3$ preparation obtained by reacting molar amounts of triethyl aluminum with $TiCl_4$ were added to the benzine. Immediately thereafter, 12 g. acetylene black having an apparent density of 46 g./liter and a tapping weight of 62 g./liter were added. The mixture was rapidly heated to 70° C. while passing ethylene through the reaction vessel from the time of start of the heating.

Within 3.5 to 4 hours, 600 g. polyethylene-carbon black composition were obtained, this amount being the average of seven experiments. However, the polymerization was by no means completed after this period of time.

In comparative experiments carried out in an analogous manner but without the addition of carbon black, a yield of only 450–475 g. polyethylene could be obtained.

EXAMPLE II

In a further example, to a two-liter stirred reactor is added 1,000 milliliters of dried, hydrogenated propylene trimer and 25 grams of Easy Processing Channel Black (E.P.C. Black). The reactor which is of the enclosed type, maintained under a nitrogen atmosphere, is controlled at a temperature of about 70° C. throughout the experiment.

To a separate, enclosed vessel of 150 milliliters capacity, controlled at a temperature of 24° C. and provided with a stirring device, are added 100 milliliters of dried, hydrogenated propylene trimer; 0.44 milliliter-0.76 gram of $TiCl_4$; and 1.12 milliliters-0.88 gram of triisobutyl aluminum, the additions taking place in the order shown under a nitrogen atmosphere.

Subsequent to aging for a period of approximately 1 minute, the contents of the smaller vessel are charged to the larger after a thorough purge of the latter with ethylene monomer. Following addition of the catalyst, the polymerization commences, and ethylene is fed to the reactor in an amount sufficient to maintain the pressure at about 745 milliliters of mercury, absolute.

The polymerization is continued for a period of two hours and twenty minutes, at which time the flow of ethylene to the reactor is discontinued, and about 15 milliliters of methanol are added to terminate the reaction. Following addition of the methanol, anhydrous HCl (gaseous) is bubbled through the reaction slurry for about five minutes. The mixture is then filtered, reslurried in methanol, filtered again and finally vacuum dried at approximately 50° C.

The procedure results in a yield of 180 grams of product, found to contain 25 grams of carbon black, a loading level equivalent to 13.9 wt. percent black. The polymeric product has a molecular weight of 400,000, a bulk density of about 5.16 lbs. per cubic foot, and the catalyst efficiency-grams of polymer produced per gram of catalyst consumned-is calculated to be 95. The product is seen to be in the form of uniformly-colored, fine granules-a valuable and readily salable product.

EXAMPLE III

In an additional example, 1,000 milliliters of dried, hydrogenated propylene trimer are added to a clean, dry, two-liter stirred reactor, maintained throughout the experiment at a temperature of 70° C. Also added to the reaction vessel are 50 grams of E.P.C. Black.

To a separate 150 milliliter reactor controlled at a temperature of about 21° C. are added 100 milliliters of dried, hydrogenated propylene trimer (H.P.T.), 0.76 gram of titanium tetrachloride, and 0.878 gram of triisobutyl aluminum, all additions of components being carried out in a nitrogen atmosphere. Following a catalyst aging period of one minute, the catalyst is added to the two-liter reactor, following thorough purging of the latter with ethylene monomer.

The reaction is automatically initiated upon addition of the catalyst system, and the pressure in the reactor is adjusted throughout the polymerization to 745 milliliters of mercury, absolute, by means of added ethylene. The reaction is continued for a period of approximately 2¾ hours before the ethylene flow is stopped and the reaction short-stopped by the addition of 15 milliliters of methanol. Anhydrous HCl is bubbled through the reaction mixture for about five minutes following termination of the reaction, and the mixture is filtered, reslurred in methanol, filtered again and vacuum dried at 50° C. in the usual fashion. By this method 132 grams of polyethylene uniformly loaded with 50 grams of carbon black, a loading level of 27.4% black, are produced. The indicated molecular weight is in excess of 400,000, the bulk density of the product is found to be about 7.22 lbs. per cubic foot, and calculation discloses the reaction to have attained a catalyst efficiency of 80 grams of polymer per gram of catalyst expended.

The product formed in this case is of particular value both as a carbon masterbatch composition suitable for let-down (dilution) in preparing polyethylene compositions having very small concentrations, i.e. 5% or less, of black, and is well adapted to the direct preparation of articles requiring the beneficial effects of high loadings of black such as, for example, in the fabrication of polyethylene pipe.

EXAMPLE IV

In this experiment, 1,000 milliliters of dried H.P.T. and 100 grams of E.P.C. Black are charged under a nitrogen atmosphere to a two-liter stirred reactor continuously maintained at a temperature of 70° C. To a separate 150 milliliter stirred reactor, controlled at a temperature of 22° C., are added the catalyst components, that is, 0.76 gram of titanium tetrachloride, and 0.878 gram of triisobutyl aluminum. The foregoing components are added to 100 milliliters of dried H.P.T. already present, under a nitrogen atmosphere.

Following a period of catalyst aging amounting to approximately one minute, the contents of the small vessel are added to the two-liter reactor-previously purged with ethylene monomer and maintained throughout the reaction at a pressure of approximately 745 milliliters mercury, absolute, by means of additional ethylene-to initiate the polymerization. The reaction is continued for a period of 3½ hours before the ethylene feed is discontinued and the reaction stopped by the addition of 15 milliliters of methanol. Anhydrous HCl is bubbled through the reaction mixture for five minutes, following which the mixture is filtered, reslurried with methanol, filtered and vacuum dried at 50° C. in the usual manner. Forty grams of polymer are thus prepared containing 100 grams of carbon black-a loading level of 71.5 wt. percent. The black is, in this case, substantially uniformly distributed throughout the mixture and can be employed in the form in which it has been produced, or it may be let down in the ordinary fashion.

EXAMPLE V

In this example, a two-liter stirred reactor is cleaned and carefully dried prior to having charged thereto 1,000 milliliters of dried H.P.T., 10 grams of E.P.C. Black, and 0.76 gram of titanium tetrachloride. To a 150 milliliter stirred reactor controlled at a temperature of 23° C. are added 100 milliliters of dried H.P.T. and 0.878 gram of triisobutyl aluminum. The contents of the 150 milliliter reactor are charged to the two-liter reactor, the latter having been thoroughly purged with ethylene, to initiate the reaction. Throughout the polymerization, the pressure is maintained with ethylene at 745 milliliters mercury absolute.

Following a reaction time of approximately 52 minutes, the reaction is short-stopped by the addition of 15 milliliters of methanol, anhydrous HCl is bubbled through the reactor for about five minutes, and the reactor's contents are worked up in the fashion previously described to produce a polyethylene product amounting to 180 grams of polyethylene loaded with 10 grams of black, a loading of 5.3 wt. percent.

The catalyst efficiency in this case is found to be 110 grams of polymer per gram of catalyst. Curiously, the polymeric product produced is in the form of elongated, fibrous particles rather than the granular product resulting from the higher loaded runs. The fibrous material, although capable of producing articles which appear to be uniformly pigmented, presents an unattractive appearance, and some difficulties are experienced in processing the material due to its unusual physical conformation. A duplicate experiment produces substantially the same type of product while an additional run, carried out as a standard, without any carbon black loading, and in which the catalyst addition procedure employed in this experiment is used, does not produce the fibrous product.

What is claimed is:

1. A process for producing compositions of carbon black and polyethylene by polymerization of ethylene at pressures up to approximately 100 kg./cm.$^2$ and at temperatures up to approximately 100° C. in the presence of catalysts consisting of mixtures of organometallic compounds of group 3 of Mendeleev's Periodic Table with compounds of metals of the 4th to 6th subgroups of that table which comprises carrying out the polymerization in the presence of more than about 50% by weight, based on the polymer, of carbon black having a particle size of up to 250 m., said carbon black having had any air contained in its pores displaced by an inert gas.

2. A process according to claim 1 in which said inert gas comprises nitrogen.

3. A process for producing compositions of carbon black and polyethylene by polymerization of ethylene at pressures up to approximately 100 kg./cm.$^2$ and at temperatures up to approximately 100° C. in the presence of catalysts consisting of mixtures of organometallic compounds of group 3 of Mendeleev's Periodic Table with compounds of metals of the 4th to 6th subgroups of that table which comprises carrying out the polymerization in the presence of from at least 10 to about 50% by weight, based on the polymer, of carbon black having a particle size of up to 250 m., said carbon black having had any air contained in its pores displaced by an inert gas.

4. A process according to claim 3 in which said inert gas comprises nitrogen.

References Cited by the Examiner

UNITED STATES PATENTS 2,912,419 11/1959 Peters et al. _____ 260—94.9
3,008,949 11/1961 Langer et al. _____ 260—41

FOREIGN PATENTS 566,294 11/1957 Italy.

MORRIS LIEBMAN, *Primary Examiner.*
ALEXANDER H. BRODMERKEL, *Examiner.*
K. B. CLARKE, A. LIEBERMAN, *Assistant Examiners.*